United States Patent [19]

Thatcher

[11] Patent Number: 5,175,534
[45] Date of Patent: Dec. 29, 1992

[54] COMPUTER INPUT DEVICE USING THE MOVEMENTS OF A USER'S FINGERS

[76] Inventor: Eric A. Thatcher, 167 E. First Ave., Apt. 43, Salt Lake City, Utah 84103

[21] Appl. No.: 530,918

[22] Filed: May 30, 1990

[51] Int. Cl.$^5$ .............................. G09G 3/02
[52] U.S. Cl. .................... 340/706; 340/709; 74/491
[58] Field of Search .......... 340/706, 709, 710; 273/438, 148 B, DIG. 26; 74/491, 523, 469; 200/52 R, 5 R, 5 A, 522, 552, 501, 505, 553, 518, 538, 519; 338/137

[56] References Cited

U.S. PATENT DOCUMENTS

| | | | |
|---|---|---|---|
| 3,370,481 | 2/1968 | Mekelburg | 200/552 |
| 3,876,848 | 4/1975 | Hartmann | 200/552 |
| 3,883,861 | 5/1975 | Heartz | 340/705 |
| 4,016,775 | 4/1977 | Carlson | 74/471 |
| 4,216,467 | 8/1980 | Colston | 340/706 |
| 4,552,360 | 11/1985 | Bromley et al. | 340/706 |
| 4,654,647 | 3/1987 | Wedam | 340/709 |
| 4,692,756 | 9/1987 | Clark | 340/709 |
| 4,721,308 | 1/1988 | Trimble | 446/176 |
| 4,806,917 | 2/1989 | Hosogue | 340/710 |
| 4,823,634 | 4/1989 | Culver | 340/710 |
| 4,933,670 | 6/1990 | Wislocki | 340/709 |

Primary Examiner—Alvin E. Oberley
Assistant Examiner—Chanh Nguyen
Attorney, Agent, or Firm—Workman, Nydegger & Jensen

[57] ABSTRACT

Disclosed is an input device for a computing machine which allows a user to input one, two, three, or more position signals controlling the same number of parameters. Such parameters can be the x, y, and z axis positions of a cursor on a display. The present invention includes structures for encoding the movement of the users fingers into position signals. The present invention is arranged so the differential movement of two of the user's fingers in a first plane generates one of the position signals. The differential movement provides that as a first finger is moved, a second finger is moved in an opposite direction and an amount proportional to the movement of the first finger. The differential movement of the user's fingers allows for more efficient, precise, and less tiresome operation by a user than with other input devices. Embodiments of the present invention can possess movement in one, two, three, or more, degrees of freedom and are able to generate one, two three, or more, position signals. In a preferred application of the present invention, apparatus embodying the present invention possessing three degress of motion can be adapted to interactively control a cursor's horizontal, vertical and zoom movements on the x, y, and z axes, respectively, on a computing machine display.

36 Claims, 7 Drawing Sheets

COMPUTER INPUT DEVICE USING THE MOVEMENTS OF A USER'S FINGERS

BACKGROUND

1. The Field of the Invention

This invention relates to input devices for use with computing machines. More particularly, the present invention relates to computer input devices which are manipulated by the user's fingers or hand to generate a position signal which is used by the computing machine to control one or more variable parameters.

2. The Prior Art

Many different devices have been developed to allow a user to communicate with, and input information into, a computing machine. Such devices include keyboards, digitizers, light pens, joy sticks, track balls, and mice. The objective of all of these devices is to provide a more efficient alternative to the widely used QWERTY keyboard.

Exemplary of these alternative devices is a mouse. A typical mouse has a generally mound-like body which is grasped by a user and a cable exiting the body (which together resemble the body and tail of a mouse) which is connected to a computing machine. Most mice include a roller ball protruding from the underside of the mouse. The roller ball makes contact with and rolls upon a work surface on which the mouse is operated. A computer program, referred to as a "driver" or "driver program," resident in the computing machine converts the rotational movement of the roller ball into first and second electrical signals which are interactively represented on a computing machine display as movement of a cursor in both an X axis and a Y axis.

Mice are now available in various versions. "Tailless" mice are available which communicate with the computing machine without an interconnecting cable. Other varieties of mice do not include a roller ball but utilize an optical sensing mechanism to detect motion across an optical grid. While the mouse has become a popular alternative to a keyboard as a computing machine input device, it has several drawbacks.

Regardless of the type of mouse used, a mouse requires a significant amount of free work surface space. Moreover, another drawback encountered when using mice is that large movements of the user's arm or hand are necessary to position the device. For example, when using a mouse it may be necessary to roll the mouse a distance of one or two feet across the work surface to move the cursor between opposing corners of the display. If the resolution of the mouse, or any other input device, is reduced so that less dramatic movement is required, then it becomes increasingly difficult to precisely position the cursor using the device.

All the widely available alternative cursor positioning devices such as trackballs, joy sticks, and digitizers present one or more difficulties to a user trying to precisely position a cursor on a display. For example, the user must overcome the starting inertia of a mouse or a digitizer when moving to a new position. Furthermore, in the case of a mouse, a user might need to sweep his arm across a desk to roughly position the mouse and then have difficulty trying to precisely position the cursor even though fine motor movements of the hand and fingers are used to carefully finish the move.

In some applications in which alternative cursor positioning devices are used, the user must merely place the cursor in a general area of the display using the mouse. In other applications, such as in computer aided design (CAD), the cursor or other display element must be moved to precisely an exact position on the display. With some alternative cursor positioning devices such as mice or joy sticks, the positioning of the cursor at the exact location required can be a frustrating challenge to the user. Merely pushing the device in the required direction often results in overshoot. Moreover, the movement of a user's arm is seldom as controllable as the fine motor movements of a user's fingers. Thus, the previously available cursor positioning devices inherently present several drawbacks and all such drawbacks reduce the efficiency of a user's inputting information to a computing machine.

In view of the foregoing disadvantages and drawbacks, it would be an advance in the art to provide an input device for a computing machine which is more efficient, more accurate, and less tiresome to use than previously available input devices. It would also be an advance in the art to provide a computing machine input device which requires only a small amount of work surface to use and which can be used to interactively control a cursor position or other variable parameters controlled by computing machines. It would also be an advance in the art to provide a computing machine input device which can generate three position signals and which utilizes the fine motor movements of the user's fingers.

OBJECTS AND BRIEF SUMMARY OF THE INVENTION

In view of the above described state of the art, the present invention seeks to realize the following objects and advantages.

It is a primary object of the present invention to provide a computing machine input device which is more efficient to use than previously available input devices.

It is also an object of the present invention to provide a computing machine input device which is easier for a user to accurately position and use than previously available alternative input devices.

It is another object of the present invention to provide a computing machine input device which is less tiresome for a user to operate than previously available devices.

It is yet another object of the present invention to provide a computing machine input device which requires only a small work surface area in which to operate.

It is still another object of the present invention to provide a computing machine input device which can be used to interactively position a cursor on a computing machine display or control other variable parameters input to a computing machine.

It is another object of the present invention to provide a computing machine input device which can generate at least three position signals.

It is a further object of the present invention to provide a computing machine input device in which fine positioning is accomplished by the fine motor movements of a user's fingers.

These and other objects and advantages of the invention will become more fully apparent from the description and claims which follow, or may be learned by the practice of the invention.

The present invention includes a first receptacle means for receiving a first finger of a user and a second receptacle means for receiving a second finger of the user. The receptacle means can comprise, for example, a finger bore in a disc, trigger-like structures, a dimple formed on a surface, a finger sized ring, a finger tip shaped cup, or other structures.

Structures are provided in the embodiments of the invention so that as a first user finger is moved, a second user finger is moved in an opposite direction and an amount proportional to the movement of the first finger. The movement of the second finger in a direction opposite to, and an amount proportional to, the movement of the first finger is termed differential movement.

In contrast to differential movement of the fingers is unison movement wherein the first and second fingers move in the same direction. A differential movement means is included in the embodiments of the present invention to cause the differential movement. The embodiments of the present invention also include means for mounting the receptacle means so that differential and/or unison movement in a first and a second plane is possible.

A first encoding means is provided to encode the differential movement of the receptacle means, imparted by the user's fingers, in the first plane into a first electrical position signal. Some embodiments of the present invention also provide for unison movement of the receptacle means in the first plane. In these embodiments, a second encoding means encodes the unison movement in the first plane into a second electrical signal.

Still other embodiments of the present invention provide for differential and/or unison movement of the receptacle means in a second plane. Generally, the second plane is orthogonal to the first plane but is not required to be so. Second, third, and fourth encoding means may be provided in some embodiments to also encode the unison movement in the first plane, the differential movement in the second plane, and the unison movement in the second plane, of the receptacle means into second, third, and fourth, respectively, electrical position signals.

Embodiments of the present invention which possess movement in one, two, three, or more, degrees of freedom are able to generate one, two three, or more, position signals. In a preferred application of the present invention, apparatus embodying the present invention possessing three degrees of motion can be adapted to interactively control a cursor's position in both the x, y, and z axes on a computing machine display. MOvements in these axes can be respectively referred to as horizontal, vertical, and zoom movements.

By utilizing differential and unison movement of the user's fingers, the embodiments of the present invention are more efficient than other alternative input devices. User of the present invention allow precise positioning while being less tiring and more convenient to use than other devices.

DETAILED DESCRIPTION OF THE PREFERRED EMBODIMENTS

Reference will now be made to the drawings wherein like structures will be provided with like reference designations. As used herein, the term "reverse view" and the like is intended to indicate a view which is opposite that of the users. As explained above, the previously available computing machine input devices all have one or more drawbacks, particularly when used as a positioning device in a high performance CAD work station or some other similar positioning task. In the description which follows, the embodiments of the present invention will be described in connection with the task of positioning a cursor, or some other display element, on an interactive computing machine display.

It will be realized, however, that embodiments of the present invention can be used to convey positioning information to various computing devices applied in a number of circumstances. For example, in addition to the applications involving a stationary computing machine, the present invention has application as the human interface portion of a land, sea, or air, guidance system. The present invention can also be applied in other circumstances where the movement of a user's fingers must be precisely translated into a numerical value.

As used herein, the term "computing machine" is intended to include any device capable of accepting input, processing the input, and providing a resulting output. The input may be a digital value (e.g., a serial train of pulses) or an analog value. The output may be manifest on a computer display, by the physical movement of a structure, or by the manipulation of data.

Figure 1:
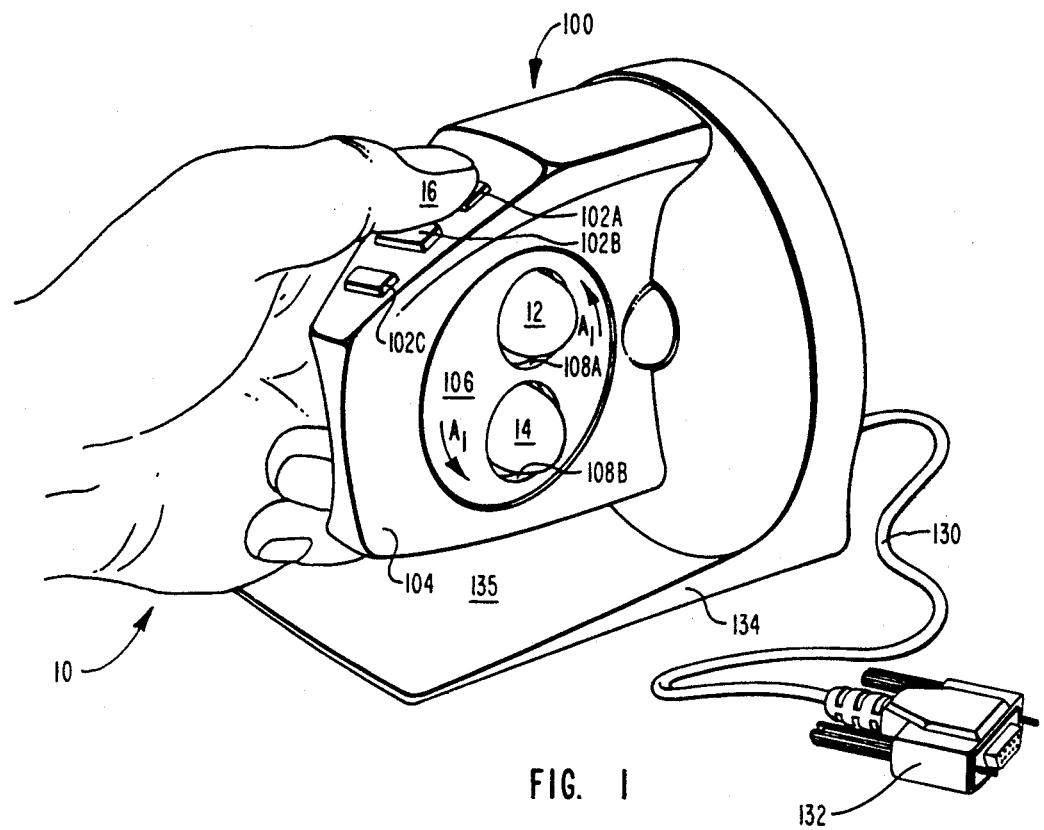
FIG. 1 is a perspective view a first presently preferred embodiment of the present invention capable of generating two position signals.

The first presently preferred embodiment of the present invention is represented in the perspective view of FIG. 1. The embodiment described in FIG. 1 allows a user to precisely and accurately generate a first and a second electrical position signal. The first electrical position signal can be used to interactively position a computing machine display cursor in a first dimension, i.e., on the x axis of the display. The second electrical position signal can be used to interactively position a cursor in a second dimension, i.e., on the y axis of the display.

Another embodiment of the present invention will be described later in this disclosure which is capable of generating position signals to interactively position a cursor in three dimensions, e.g.. horizontal, vertical, and zoom movements on the x, y, and z axes, respectively. Utilizing the concepts taught herein, those skilled in the art will be able to devise other embodiments capable of position control in multiple dimensions and controlling parameters in addition to position (e.g., display color and intensity).

The perspective view of FIG. 1 shows the external structures of the first presently preferred embodiment and a user's hand 10 in place ready to use the embodiment. Represented in FIG. 1 is a first user finger 12 which has been inserted into a first finger receptacle 108A. Also represented is a second user finger 14 which has been inserted into a second finger receptacle 108B.

The first and second finger receptacles 108A-B are formed in disc 106 which, as will be explained in detail shortly, is rotatably mounted within side walls (one of which is designated 104) which are part of a tiltable housing 100. A user's thumb 16 is shown resting on one of three control buttons 102A-C. The buttons 102A-C function similarly to the buttons provided on mice and other similar alternative input devices. Thus, a user who is accustomed to using a mouse can immediately become comfortable using the embodiments of the present invention described herein.

Figure 2:
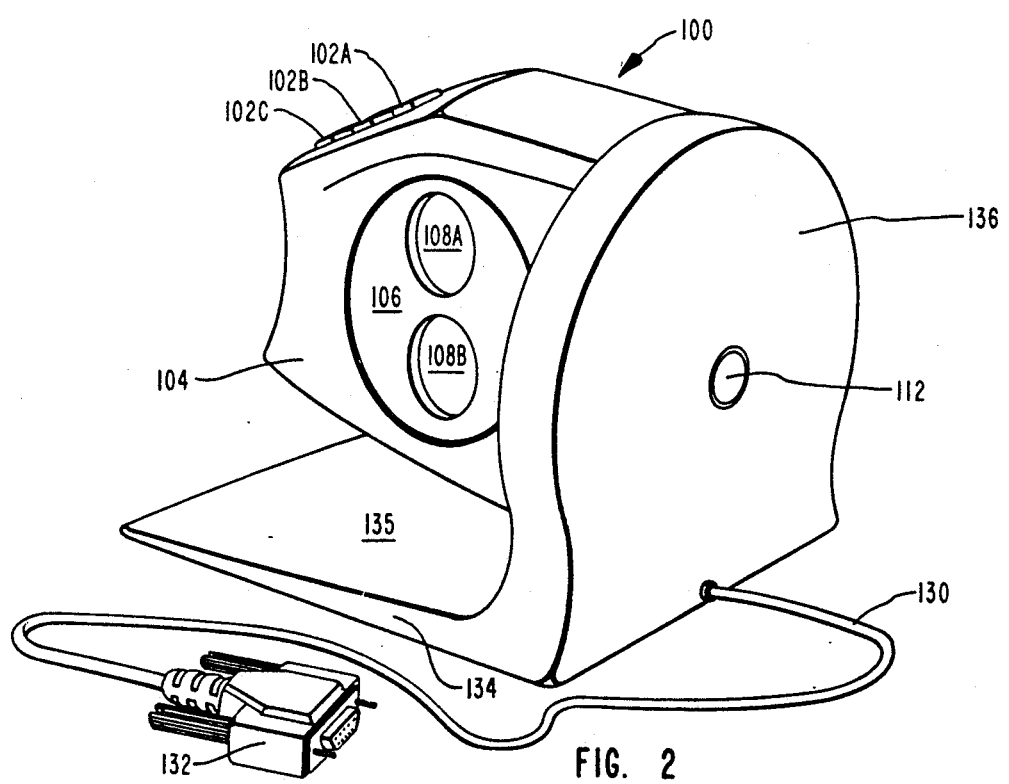
FIG. 2 is a reverse perspective view of the first presently preferred embodiment represented in FIG. 1.

Referring next to the reverse perspective view of FIG. 2, the semicircular shape of an encoder housing back side 136, attached to a base 134, is illustrated. The gently sloping, semicylindrical shape of the upper side 135 of the base 134 provides a comfortable place for the user's hand to rest during manipulation of the embodiment. The lower side of the base is adapted to be set upon a work surface of some kind (e.g., a desk or table top). The base can be attached to the work surface or can merely rest upon it.

The present invention allows a user to employ the fine motor movements of two fingers to generate one, two, or more position signals. Due to the nature of previously available alternative input devices, such as mice and joysticks, gross motor movements of the users arm and wrist are required. In particular, the use of a mouse for extended periods of time can become fatiguing because of the large repetitive movements of the muscles of the user's arm.

In contrast, the embodiments of the present invention require only fine motor movements and allow the user to rest the arm and hand on a comfortable surface. Furthermore, the structure of the present invention allows more precise position control than possible with previously available alternative input devices. The embodiments of the present invention also present a great advance over the prior art by combining the small footprint of a joystick with the ease of use of a mouse and the precision of a large digitizer pad.

Figure 3A:
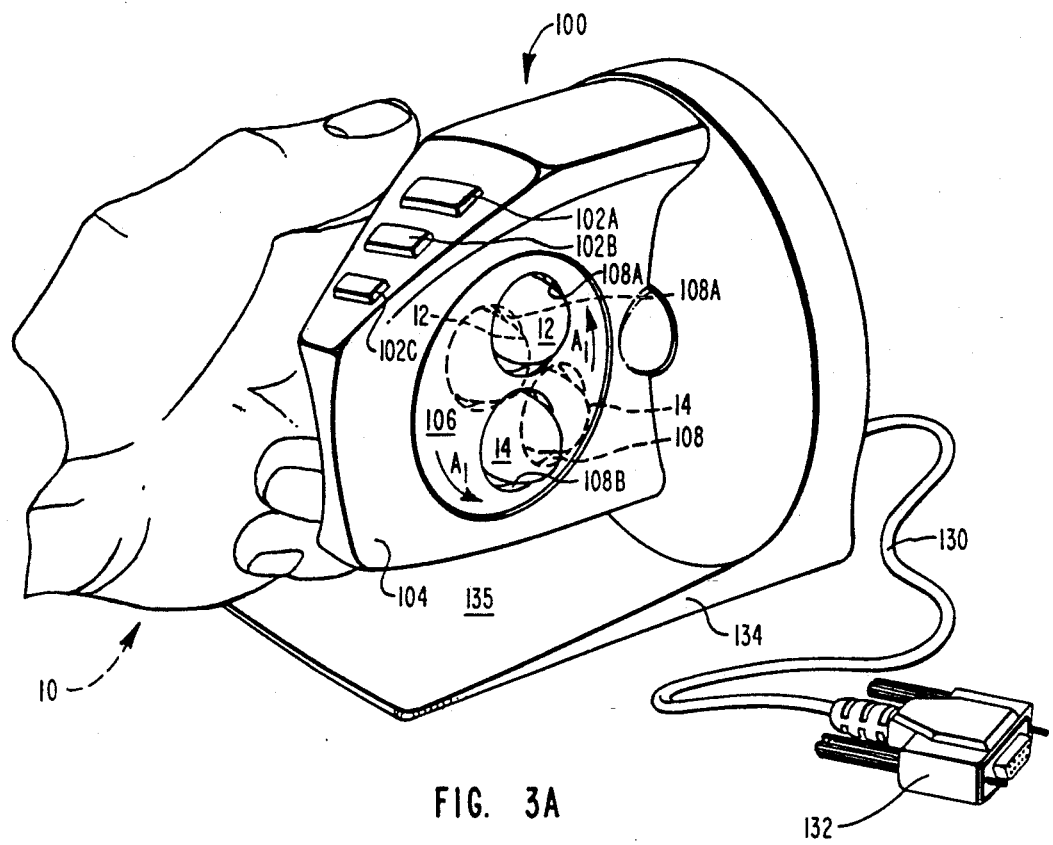
FIG. 3A is another perspective view of the first presently preferred embodiment represented in FIG. 1 showing the manipulation of the device by the user's fingers in a first plane.
Figure 3B:
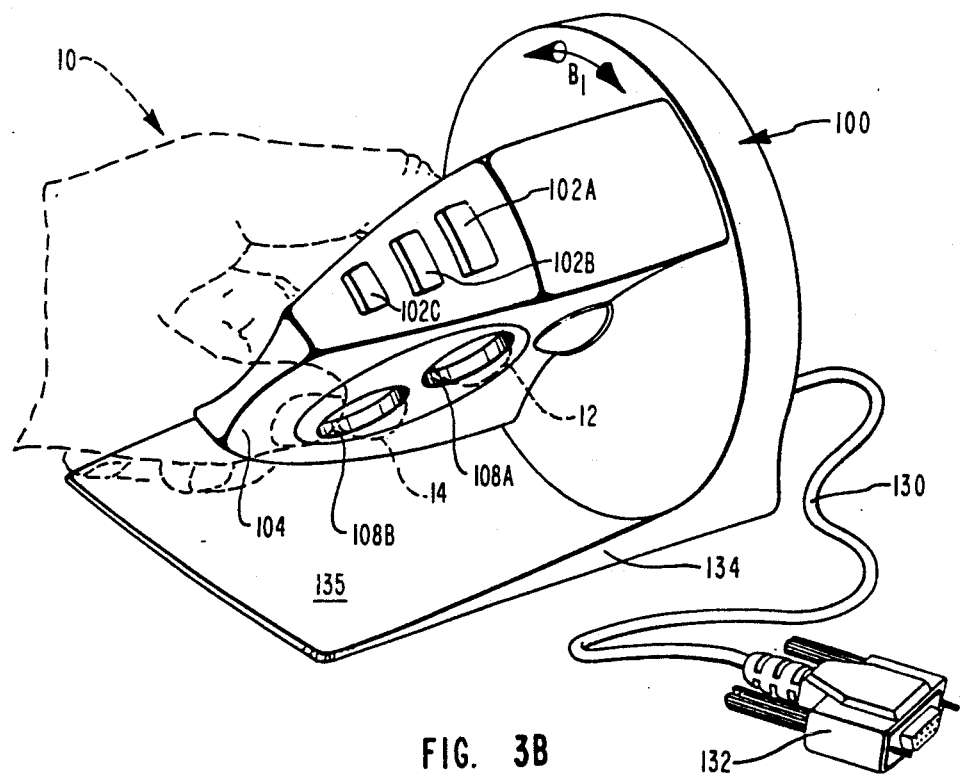
FIG. 3B is another perspective view of the first presently preferred embodiment represented in FIG. 1 showing the manipulation of the device by the user's fingers in a second plane.

Referring next to FIGS. 3A and 3B, the first presently preferred embodiment of the present invention is illustrated with the user's hand in place and the user's first finger 12 and second finger 14 manipulating the position of the disc 106. It will be appreciated that it is not necessary to completely insert the fingers into the receptacles 108A-B but, if preferred, merely to rest one's fingers into the receptacles 108A-B in order to advantageously use the present invention.

Shown in FIG. 3A are the user's fingers 12 and 14 moving from a first position (solid image) to a second position (phantom image). In the first illustrated embodiment, the motion of the user's fingers as disc 106 rotates is best generally described as "differential" motion or movement. By the use of term differential, it is intended to define the motion where a second finger is moved in a direction in opposition to, and an amount which is proportional to, the movement of a first finger. The motion of the user's fingers 12 and 14 in FIG. 3A is referred to as differential motion in a first plane, i.e., the plane defined by the disc 106.

The differential motion of the present invention is easier and results in more precise control for a user when compared to the previously available alternative input devices. Rather than merely pushing a mouse or a joystick in a direction, the structures of the present invention allow a user to utilize the flexion movement (i.e., bending) of one finger against the extension movement (i.e., straightening out) of another finger. The forces applied by the two fingers can be balanced to hold a position or varied for making precise position changes.

In practice, a user can manipulate the disc 106 using just the first or the second finger for rough positioning and bring both fingers into play when precise positioning is required. Moreover, a user will find that manipulation of the described embodiments are intuitive requiring very little practice prior to becoming proficient in the use of the device.

In FIG. 3A, the user's fingers are shown having rotated the disc 106 in a first plane from a first to a second position in the direction of arrows $A_1$. In the example used to describe the presently preferred embodiments, the movement of the fingers from the first illustrated position to the second illustrated position causes a cursor on a interactive computing machine display to move along the y axis of the display.

In FIG. 3B, the user's fingers are shown having tilted the disc 106 and the housing 100 in a second plane from a vertical position to a non vertical position in the plane defined by arrow $B_1$. The motion represented in FIG. 3B is also referred to as differential motion but it is differential motion which occurs in a second plane which is different than the first plane. In the example used to describe the presently preferred embodiments, the tilting movement of disc 106 and the housing 104 from the first vertical position to the second illustrated tilted position causes a cursor on a interactive computing machine display to move along the x axis of the display.

Since the first described embodiment represented in FIGS. 1-4 possesses movement in two degrees or dimensions, it allows a user to precisely control an interactive cursor display in two axes. Moreover, as indicated earlier, the user's manipulation of described embodiments can result in position signals being generated which can be used to control any two appropriate parameters of a computing machine. For example, any application requiring the inputting of position, e.q. navigation, or any other appropriate parameter such as display color, etc., will benefit from the present invention.

Figure 4:
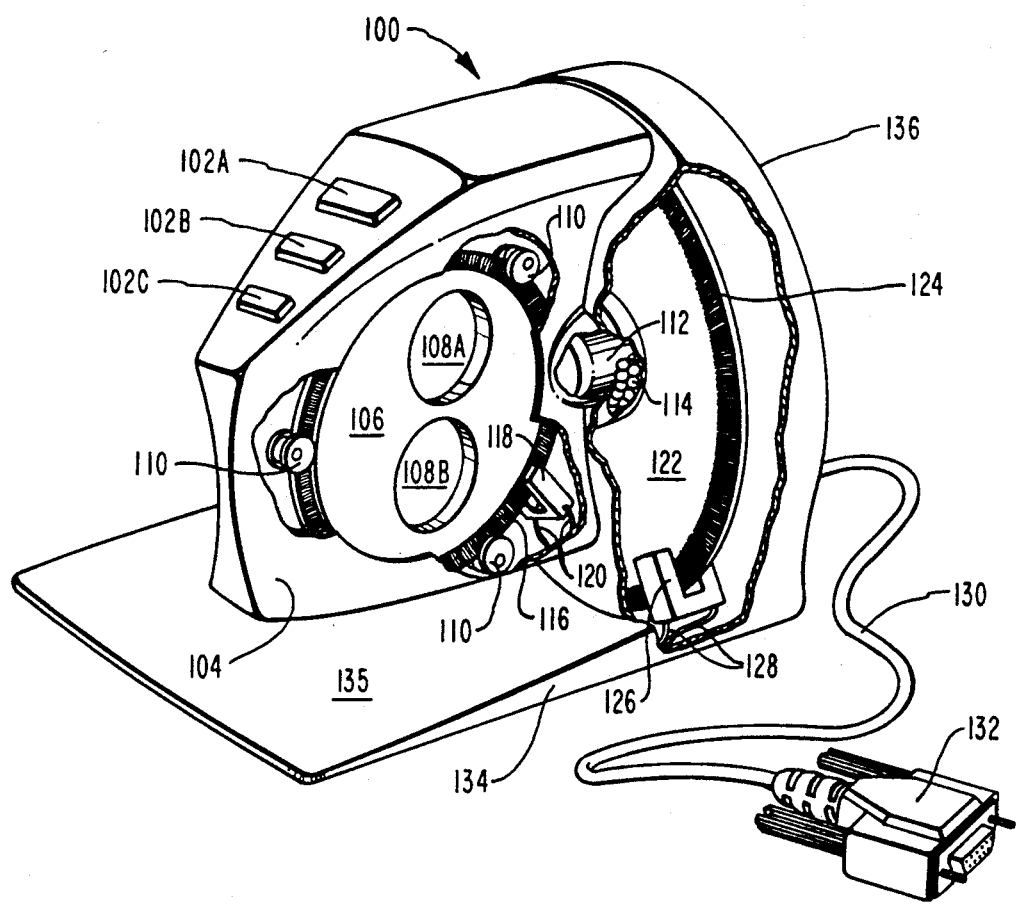
FIG. 4 is a partially cutaway perspective view of the first presently preferred embodiment represented in FIG. 1.

FIG. 4 is a partially cutaway perspective view of the first presently preferred embodiment of the present invention showing its principal internal components.

As represented in FIG. 4, the disc 106 is a circular disc mounted on a plurality of rollers 110 which allow the disc 106 to rotate circumferentially. Around the circumference of the disc 106 are a plurality of very closely positioned, radially spaced optical markings 116. The movement of the markings 116 are optically sensed by sensor 118.

In the described embodiment the sensor 118 comprises two parallel arms, a first arm containing a light emitting source and a second containing an optical sensing device. The disc 106 and the sensor 118, and other necessary components, are commercially available and may be similar or identical to those manufactured by Sumtak (a division of Daido Corp.) model LDA. More information concerning the illustrated encoding structures will be provided later in this disclosure and particularly in connection with FIG. 12.

In the described embodiment, as each marking passes between the arms of the sensor 118 a pulse is generated. The pulse which is generated is carried by wires 128 directly to an interconnecting cable 130 where the pulses can be conveyed as an electrical position signal to a computing machine by plug 132. It is also within the scope of the present invention to include active circuitry within the housing of the embodiment to carry out wave shaping or other signal processing techniques.

Either receptacle 108A or receptacle 108B can function as one presently preferred example of a means for detecting the movement of a first finger in a first plane. Also, rather than the finger receptacles 108A-B being fabricated as circular apertures, any structure capable of holding a finger while still allowing the user to move the finger is intended to fall within the scope of the means for detecting the movement and the receptacle means. For example, rather than the circular apertures illustrated in FIG. 4, these structures could comprise, among other structures, dimples formed on a surface, finger sized rings, or finger tip shaped cups. The structure chosen needs to allow rotation of the finger while preferably still allowing the user to feel close contact and control with the structure.

The combination of the receptacle 108B, functioning as a receptacle means, and the disc 106 is one presently preferred example of a means for differentially moving a second finger in an opposing direction and an amount proportional to the movement of the first finger. The combination of the receptacle 108B and the disc 106 is also a presently preferred example of a differential movement means. Any device capable of proportionally moving a second finger in substantially the same plane and in an opposing direction as the user moves the first finger is intended to fall within the scope of the means for differentially moving a second finger.

By including the means for differentially moving a second finger, the user is provided with greater control for interactive positioning tasks. Rather than relying on just the flexion or extension movement of a single finger, movement is caused by, for example, the flexion movement of a first finger and the extension movement of a second finger. Alternatively, a position can be held by a user by exerting flexion pressure with both fingers. This arrangement allows a user to precisely find and hold a position.

Also represented in FIG. 4 is an optical disc 122 which is also provided with a plurality of closely positioned, radially spaced optical markings 124. While disc 106 is used to encode the movement of the user's fingers in a first plane, optical disc 122 is used to encode the movement of the user's fingers in a second plane. Both the motion in the first plane and in the second plane is the earlier described differential type of motion.

The optical disc 122 is mounted on a shaft 112 which is rotatably supported by bearings 114. The bearings 114 are one example of the several structures, both explicitly disclosed herein and generally known in the art, which can function as a means for mounting which will allow the pertinent structures to rotate, tilt, or move as necessary. The housing 100 is connected to the shaft 112 so that the housing 100 can tilt as illustrated in FIG. 3B. As the user tilts housing 100, optical disc 122 rotates causing the optical markings pass through sensor 126 in a fashion like that described in connection with sensor 118. The electrical pulses generated by sensor 126 function as another electrical position signal and all of the position signals which are generated are conveyed to a computing machine by wires 128, cable 130, and plug 132.

It will be appreciated that the origination of the programming code or software, generally referred to as a "driver," necessary to translate the position signals generated by the sensors 118 and 126 is within the knowledge of one skilled in the art. Drivers such as those used with mice, such as the mice and drivers available from Microsoft Corporation or other vendors, can be adapted for use with the present invention. Such drivers can be modified for use as, or used as a model for, a driver for use with the embodiments of the present invention. Those skilled in the art will also understand to use the described structures, or incorporate additional structures, to allow the direction, as well as the amount, of the motion of the user's fingers to be encoded and to utilize a driver with appropriate features.

Figure 5:
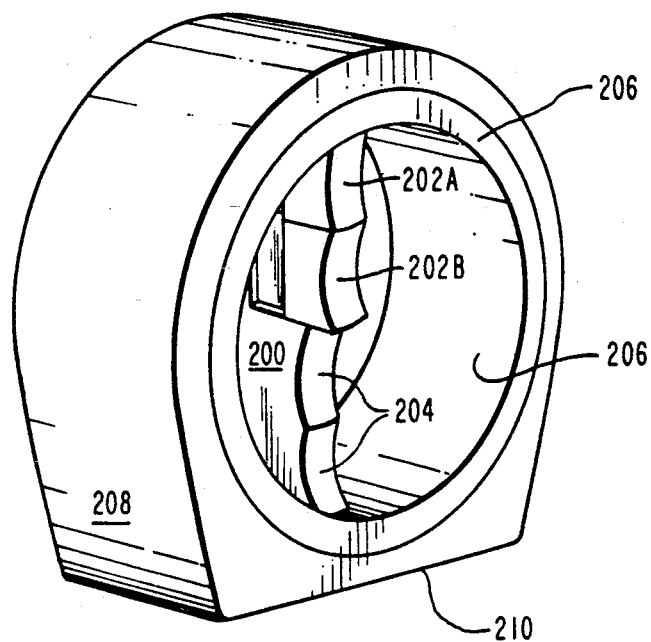
FIG. 5 is a reverse perspective view of a second presently preferred embodiment of the present invention capable of generating two position signals.
Figure 6:
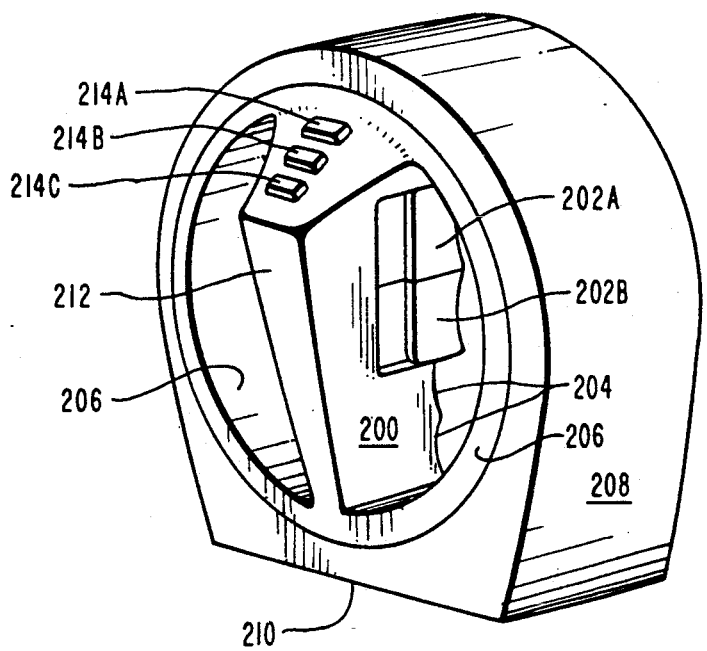
FIG. 6 is a perspective view of the second presently preferred embodiment represented in FIG. 5.

A second presently preferred embodiment of the present invention is illustrated in FIGS. 5 and 6. The second embodiment includes a housing 208 having a flat surface 210. Also represented is a grip 200 with two finger rests 204.

A user of the second described embodiment approaches the device from the side illustrated in FIG. 6 and wraps four fingers of one hand around the grip 200 with generally the first and second fingers resting on a first and a second trigger 202A-B, respectively, and two fingers on finger rests 204. The palm of the user's hand is brought to rest against the spine 212 of the grip 200. Buttons 214A-C are operated by the user's thumb and function as do buttons 102A-C of the embodiment illustrated in FIG. 1. It will be appreciated that, as is the case with the first described embodiment, the embodiment illustrated in FIGS. 5-8 accommodates either a left or a right hand.

The two triggers 202A-B represented in FIG. 6 are additional examples of the receptacle means of the present invention. The details of the triggers 202A-B are shown in the partially cut away perspective view of FIG. 7.

Figure 7:
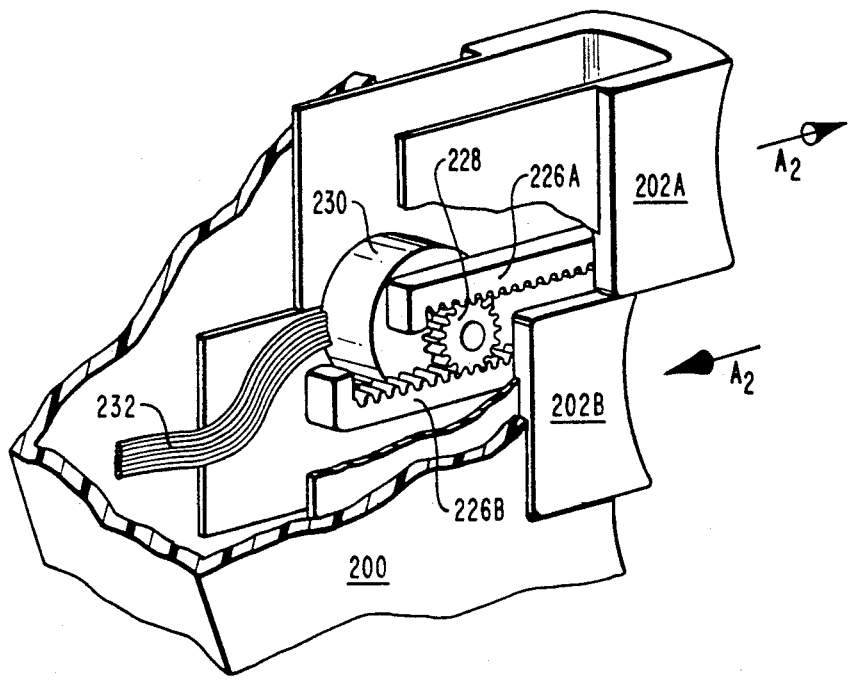
FIG. 7 is a is a cutaway perspective view of a portion of the internal structures of the second presently preferred embodiment represented in FIG. 5.

As shown in FIG. 7, the structures of the first and second triggers are arranged so that the flexion movement of a first finger results in the extension movement of a second finger as indicated by arrows $A_2$. In the arrangement represented in FIG. 7, either of the triggers 202A-B can function as the means for detecting the movement of a first finger in a first plane while the other trigger functions as the means for differentially moving a second finger in substantially the first plane in an opposing direction and an amount proportional to the movement of the first finger. It will be appreciated that the structure of the triggers 202A-B can be altered to suit any number of applications and still fall within the scope of the present invention.

As shown in FIG. 7, each of the triggers 202A-B has a toothed rack, 226A-B, respectively, connected thereto. As the triggers 202A-B are moved in a first plane, the toothed racks are moved commensurately. As one trigger is moved inwardly, the toothed rack engages the pinion gear 228 causing the other toothed rack and trigger to move proportionally in an opposite direction. The differential movement allows the flexion movement of a first finger to be balanced against the extension movement of a second finger. When a position is to be held, flexion tension on both fingers allows the user to hold the desired position accurately and to make slight positional corrections with great precision.

The pinion gear 228 is connected to the shaft of a rotary encoder 230. The rotary encoder 230 can be an optical encoder such as Model LBK manufactured by Sumtak (a division of Daido Corp.) of Piscataway, N.J. Other encoders, both optical and those using different technologies, may also be used within the scope of the present invention.

The movement of the triggers 202A-B causes the pinion gear 228 to rotate causing the rotation of the rotary encoder 230 shaft. The rotation of the shaft of the rotary encoder 230 generates a signal which serves as an electrical position signal which is conveyed by wires 232. The toothed racks and the pinion gear are the presently preferred example of a means for moving the second trigger in an opposite direction from the movement of the first trigger.

Referring again to FIG. 6, the second described embodiment provides freedom of movement in two degrees or dimensions and thus can control two parameters. In addition to the differential movement of the triggers 202A-B in a first plane, the grip 200 of the second described embodiment tilts in a plane which is substantially orthogonal to the first plane. The tilting motion of the grip corresponds to a second position signal which is generated by the embodiment of the present invention as will be explained next.

Figure 8:
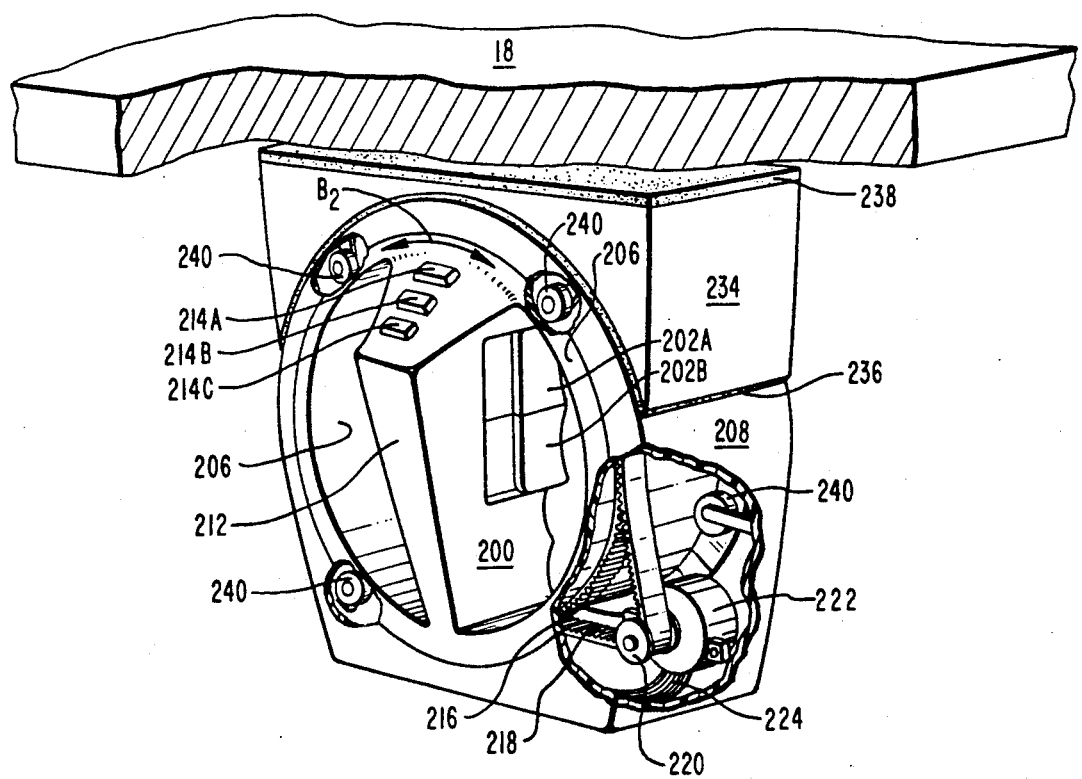
FIG. 8 is a partially cutaway perspective view of the second presently preferred embodiment mounted under a work surface.

FIG. 8 provides a partially cut away perspective view of the second described embodiment showing the arrangement of some of the internal components of the embodiment. As shown in FIG. 8, the grip 200 is mounted on a drum 206 which is rotatably supported in the housing 208 by rollers 240.

As the user tilts the grip, thereby rotating the drum 206, in the direction of arrow $B_2$, a row of teeth 206 provided on the outer circumference of the drum 206 engage a toothed belt 218 which is passed around a pulley 220. As the toothed belt moves in accordance with the rotation of the drum 206, the rotation of the pulley 220 causes the shaft of a rotary encoder 222 to also rotate. The rotation of the shaft of the rotary encoder causes the rotary encoder 222 to generate an electrical position signal in the previously described fashion. The electrical position signal is conveyed by wires 224. The rotary encoder 222 can also be one of the several appropriate models manufactured by Sumtak as indicated earlier. The embodiment represented in FIGS. 5-8 possesses freedom of motion or movement in two degrees or dimensions and thus can control two position parameters.

The second described embodiment illustrated in FIGS. 5-8 can be conveniently mounted in several configurations. For example, the flat surface 210 may merely rest on a work surface or may be attached thereto. Also, the second described embodiment may be mounted to the underside of a work surface 18 as shown in FIG. 8. To facilitate mounting under a work surface, a mounting block 234 is provided. The mounting block 234 is provided with a lower adhesive layer 236 to adhere to the described embodiment and an upper adhesive layer 238 to adhere to the bottom of the work surface 18.

Figure 9:
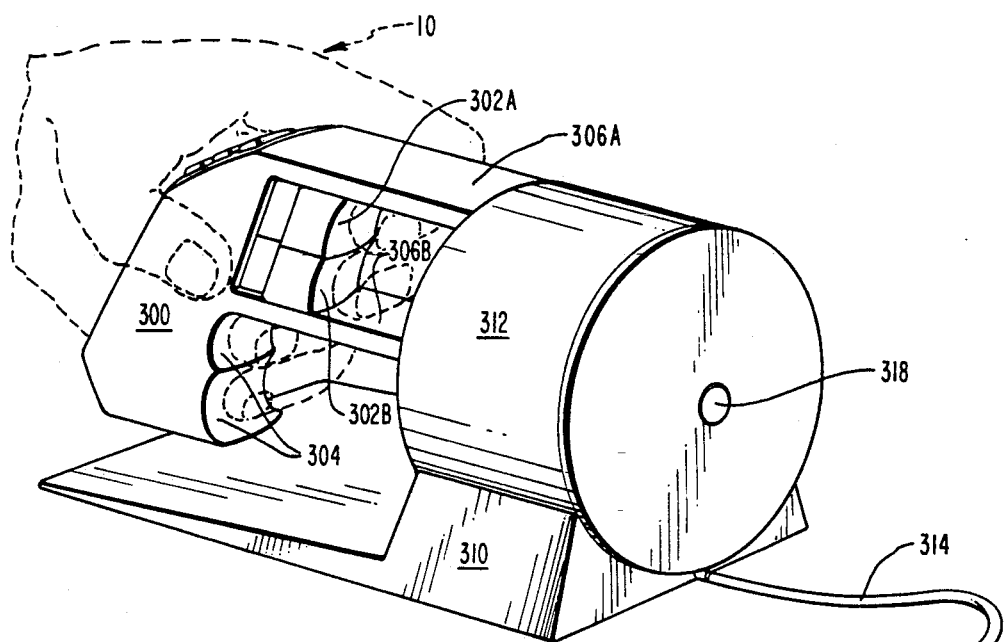
FIG. 9 is a reverse perspective view of a third presently preferred embodiment of the present invention capable of generating three position signals.
Figure 10:
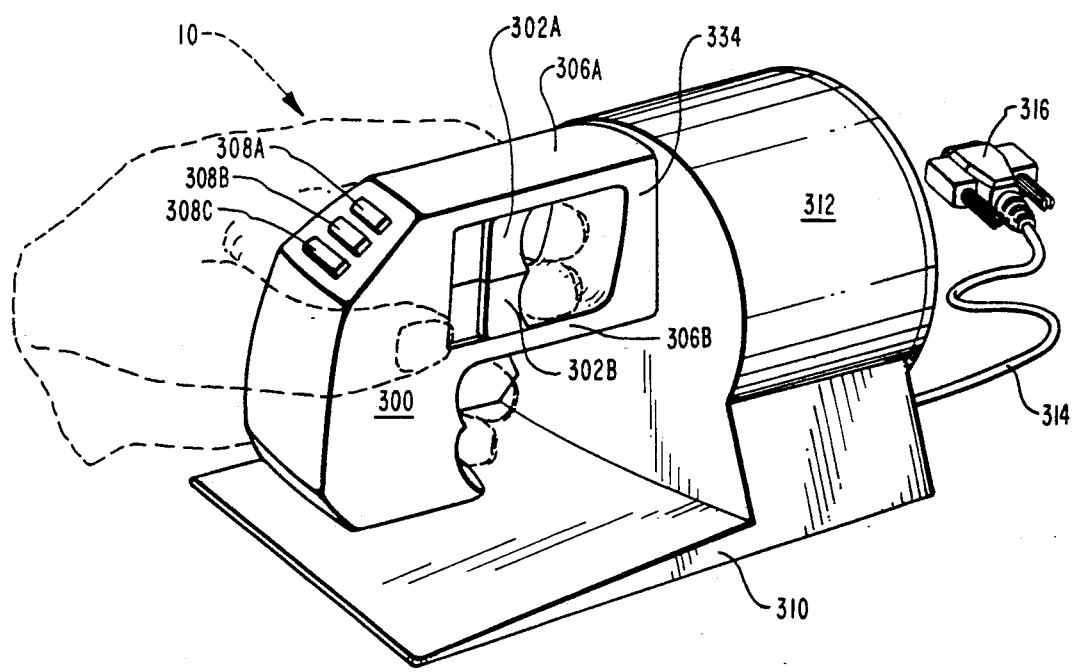
FIG. 10 is a perspective view of the third presently preferred embodiment of the present invention represented in FIG. 9.
Figure 11:
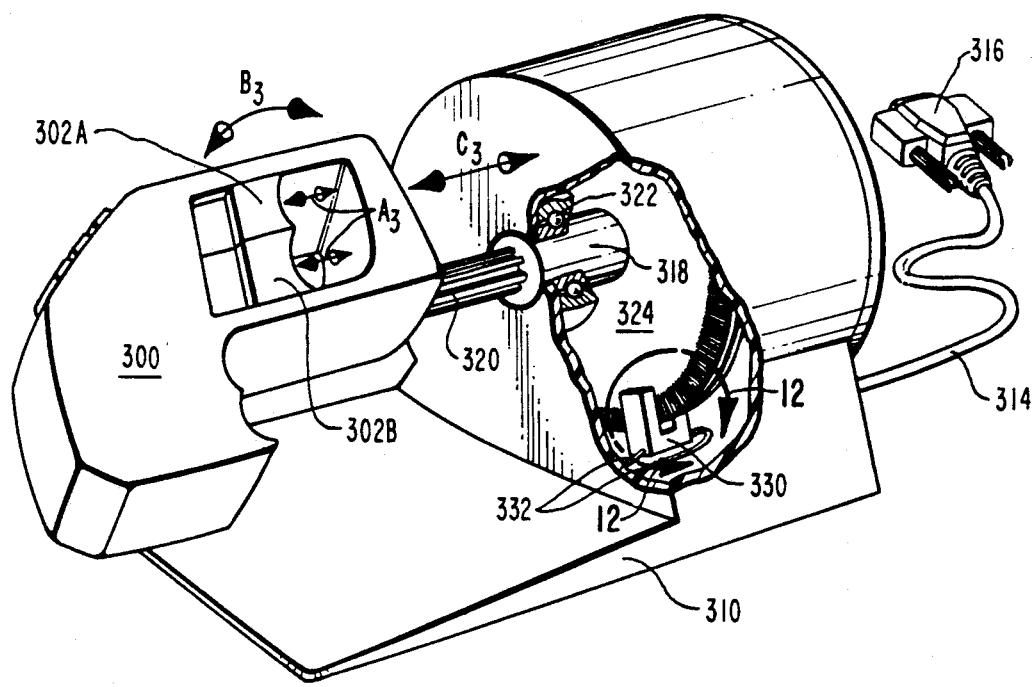
FIG. 11 is a partially cutaway perspective view of the third presently preferred embodiment represented in FIG. 9.

Reference will be made next to FIGS. 9 and 10 which are reverse perspective and perspective views, respectively, of a third presently preferred embodiment of the present invention. As will be fully explained shortly, the embodiment illustrated in FIGS. 9–11 is able to control three parameters. In contrast, the previously described embodiments of the present invention can simultaneously control just two parameters.

As shown in FIG. 9, the third described embodiment includes a pistol grip 300, a first trigger 302A, a second trigger 302B, and finger rests 304. The triggers 302A-B and their associated components may be arranged as described in connection with FIG. 7. Thus, the triggers 302A-B move differentially as shown in FIG. 7 and their movement can be used to generate a position signal.

As represented in FIG. 9, the third embodiment includes a base 310 and a cylindrical housing 312. Similarly to the earlier described embodiments, a cable 314 and a plug 316 are provided to facilitate connection to a computing machine (not shown).

As shown in FIG. 10, upper and lower connecting members 306A-B connect the pistol grip 300 to a support member 334. The pistol grip 300 includes three buttons 308A-C which function similarly to the buttons 102A-C represented in FIG. 1. A user's hand 10 is shown in phantom image in position with the first and second fingers on the triggers 302A-B, the remaining fingers laid on the finger rests 304, and the palm of the hand resting against the pistol grip 300.

Referring next to FIG. 11, a partially cut away perspective view of the third presently preferred embodiment of the present invention is provided showing the freedom of movement in three dimensions allowed by the represented structure.

The first freedom of movement is provided by the differential movement of the triggers 302A-B and is indicated by the arrows designated at $A_3$. The second freedom of movement is indicated by the arrow designated at $B_3$. Movement in the second freedom of movement is encoded into a position signal by a disc 324 provided with spaced optically sensed markings and a sensor 330. As the pistol grip is rotated as indicated by arrow $B_3$, the rotation of disc 324 is sensed by sensor 330 and a pulse train is conveyed by wires 332. The disc 324 and the sensor 330 may be of the same or similar construction and operation as the disc 124 and the sensor 126 illustrated in FIG. 1. More information concerning the disc 324 and sensor 330 will be provided in connection with FIG. 12.

Movement in the third freedom of movement is indicated by arrow $C_3$. The movement indicated by arrow $C_3$ is allowed by splined shaft 320 which is axially attached to support member 334. The splined shaft 320 is received into a linear variable displacement transformer (LVDT) 318. The linear variable displacement transformer 318 is mounted on bearings 322 which allow the LVDT 318 and the pistol grip 300 to rotate.

The linear variable displacement transformer 318 is a variable inductor which accurately measures linear displacement. As the splined shaft 320 is moved in the direction of arrow $C_3$ the signal which is generated is varied proportionally to the position of the splined shaft 320.

An LVDT commercially available from Data Instruments, Inc. of Acton, Mass., model no. FLDT (Fast Linear Displacement Transducer) is preferred to be adapted for use as the LVDT 318 represented in FIG. 11. The preferred LVDT can be readily adapted by one skilled in the art for use in the present invention including the electrical circuitry necessary to process the output of the LVDT into an electrical position signal which can be input to a computing device. The specified model no. FLDT of LVDT consists of a single coil wound on a polyamide bobbin. As an aluminum core (the splined shaft 320) is moved within the bobbin, the coil inductance is changed. The change in coil inductance is encoded into an electrical signal by a processing circuit, such as one of the signal processors available from Data Instruments designed for use with the model no. FLDT.

The movement of the triggers 302A-B, and thus the user's fingers, in the motion indicated at arrow $C_3$ is referred to as unison motion or movement since the relationship between the users first and second fingers need not change but the user's fingers move together in the same direction. Thus, the third embodiment illustrated in FIGS. 9-11 is able to provide, for example, horizonal, vertical, and zoom positioning of a cursor on a computing machine display.

Figure 12:
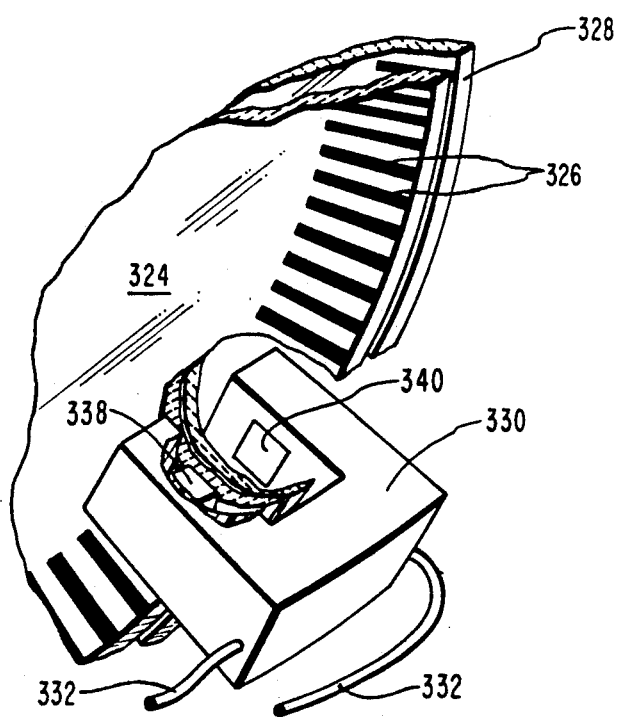
FIG. 12 is an enlarged view taken along line 12—12 of FIG. 11 showing the structure of an encoder component included in some of the illustrated embodiments.

The enlarged partial perspective view of FIG. 12 provides a diagrammatic representation of the major portions of the disc 324 and the sensor 330 included in the embodiment represented in FIGS. 9-11. Shown in FIG. 12 is the disc 324 having a plurality of closely positioned, radially spaced optical markings 326 provided thereon. A stationary disc 328 with similar markings is positioned parallel to the disc 324. The sensor 330 is provided with a light source 338 in one arm and a phototransducer 340 in the opposing arm. The sensor 330 is oriented so that as the disc 324 rotates, the light from the light source 338 is alternately blocked and allowed to pass through the discs 324 and 328 onto the phototransducer 340. As the light is alternately blocked and allowed to pass, electrical pulses are generated. It will be understood that many different arrangements for encoding the movement of the described structures in any of the three described degrees of freedom can be fabricated according to the teachings set forth herein and the available teachings in the art and such different arrangements are intended to be included within the scope of the present invention.

The embodiments of the present invention having freedom of motion in two degrees are readily adapted to interactively control the x axis and y axis position of a cursor on a display. Nevertheless, the two position signals generated by these embodiments can be used to control parameters other than the x axis and y axis position of a cursor. Such parameters need not be spatial and may include, for example, parameters such as intensity, rate of change, or color. Moreover, the embodiment of the present invention having freedom of motion in three degrees is readily adapted to interactively control the x, y, and z axis position of a cursor on a display but may control other parameters as explained. For example, the third degree of motion can be used to alter the resolution on the other two degrees of motion so that the user can choose between low resolution/rapid cursor movement for coarse positioning and high resolution/slow cursor movement for fine positioning.

In addition to embodiments providing three degrees of motion, those skilled in the art will be able to use the teachings contained herein to fabricate embodiments of the present invention possessing freedom of motion in four or more degrees. Embodiments of the present invention capable of motion in four or more degrees can provide an equal number of position signals and are capable of controlling an equal number of parameters.

As will now be appreciated, the present invention provides a computing machine input device which is more efficient, more precise, and less tiresome to use than previously available input devices. Moreover, the embodiments of the present invention require only a small work surface area to operate, in contrast to some other input devices, and can be used to interactively position a cursor on a computer display or control other position sensitive devices. Still further, embodiments of the present invention can generate two, three, or more position signals and utilize the fine motor movements of a user's fingers for precise position control.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for converting the movements of a user's fingers into at least one electrical signal suitable for input into at least one electrical signal suitable for input into a computing machine, the apparatus comprising:
    means for detecting the movement of a first finger in a first plane;
    means for differentially moving a second finger in substantially the first plane in an amount proportional to, and in a direction in opposition to, the movement of the first finger such that the user can accurately control the position of the first finger;
    means for encoding the differential movement of the first finger in the first plane into a first electrical position signal proportional to the movement of the first finger in the first plane such that the user can control a position parameter using the fine motor movements of the fingers; and
    base means for supporting and stabilizing said detecting means and said differentially moving means on a work surface to enable said detecting means and said differentially moving means to be controlled with a single hand.

2. An apparatus for converting the movements of a user's fingers into at least one electrical signal suitable for input into a computing machine as defined in claim 1 further comprising:
    means for detecting the movement of the first finger in a second plane; and means for encoding the movement of the first finger in a second plane into a second electrical position signal proportional to the movement of the first finger in the second plane such that the user can control two position parameters using the fine motor movements of two fingers.

3. An apparatus for converting the movements of a user's fingers into at least one electrical signal suitable for input into a computing machine as defined in claim 2 wherein the means for detecting the movement of the first finger in a second plane comprises means for detecting the differential movement of the first and the second finger in a second plane.

4. An apparatus for converting the movements of a user's fingers into at least one electrical signal suitable for input into a computing machine as defined in claim 2 wherein the means for detecting the movement of the first finger in a second plane comprises means for detecting the unison movement of the first and the second finger in a second plane.

5. An apparatus for converting the movements of a user's fingers into at least one electrical signal suitable for input into a computing machine as defined in claim 2 wherein the second plane is substantially orthogonal to the first plane.

6. An apparatus for converting the movements of a user's fingers into at least one electrical signal suitable for input into a computing machine as defined in claim 2 wherein the means for encoding the differential movement comprises a first optical encoder and the means for encoding the movement of the first finger in a second plane comprises a second optical encoder.

7. An apparatus for converting the movements of a user's fingers into at least one electrical signal suitable for input into a computing machine as defined in claim 6 wherein the optical encoders each comprise a rotating disc having optical marks placed about its circumference and an optical sensor adapted to sense passing of the optical marks as the disc rotates.

8. An apparatus for converting the movements of a user's fingers into at least one electrical signal suitable for input into a computing machine as defined in claim 2 further comprising:
   means for detecting the unison movement of the user's first and second fingers in the first plane; and
   means for encoding the unison movement of the user's first and second fingers in the first plane into a third electrical position signal being translatable into a position in a third dimension such that the user can control three position parameters using the fine motor movements of two fingers.

9. An apparatus for converting the movements of a user's fingers into at least one electrical signal suitable for input into a computing machine as defined in claim 8 wherein the means for encoding the unison movement of the user's first and second fingers in the first plane comprises a linear variable displacement transformer.

10. An apparatus for converting the movements of a user's fingers into at least one electrical signal suitable for input into a computing machine as defined in claim 8 wherein the three position parameters comprise an X axis position, a Y axis position, and a Z axis position.

11. An apparatus for converting the movements of a user's fingers into at least one electrical signal suitable for input into a computing machine as defined in claim 8 wherein the three position parameters comprise an X axis position, a Y axis position, and an intensity attribute.

12. An apparatus for converting the movements of a user's fingers into at least one electrical signal suitable for input into a computing machine as defined in claim wherein the means for detecting comprises a first finger receptacle.

13. An apparatus for converting the movements of a user's fingers into at least one electrical signal suitable for input into a computing machine as defined in claim 12 wherein the means for differentially moving comprises a second finger receptacle and a rotating member, the first finger receptacle and the second finger receptacle being mounted on the rotating member.

14. An apparatus for converting the movements of a user's fingers into at least one electrical signal suitable for input into a computing machine as defined in claim 1 wherein the means for detecting comprises a first finger trigger and wherein the means for differentially moving comprises a second finger trigger and means for moving the second finger trigger in an opposite direction from the movement of the first finger trigger.

15. An apparatus for converting the movements of a user's fingers into at least one electrical signal suitable for input into a computing machine as defined in claim 14 wherein the means for moving the second finger trigger in an opposite direction from the movement of the first finger trigger comprises a first and a second toothed rack connected to the first and second finger trigger, respectively, and a pinion gear engaging the first and the second toothed racks.

16. An apparatus for converting the movements of a user's fingers into at least one electrical signal suitable for input into a computing machine as defined in claim 1 wherein the means for encoding the differential movement comprises a rotary encoder.

17. An apparatus for converting the movements of a user's fingers into at least one electrical signal suitable for input into a computing machine as defined in claim 1 further comprising at least one control button.

18. A system for generating user controlled input signals to a computing machine comprising:
   first receptacle means for receiving a first finger of a user such that the movement of the first finger is transferred to the first receptacle means;
   second receptacle means for receiving a second finger of the user such that the movement of the second receptacle means is transferred to the second finger;
   differential movement means for moving the second receptacle means in a first plane and in a direction opposite to the direction of, and an amount proportional to, the movement of the first receptacle means in the first plane;
   means for mounting the first receptacle means to allow movement in a second plane;
   first encoding means for generating a first electrical position signal proportional to the movement of the first receptacle means in the first plane, the first electrical position signal capable of being translated into a position in a first dimension;
   second encoding means for generating a second electrical position proportional to the movement of the first receptacle means in the second plane, the second electrical position signal capable of being translated into a position in a second dimension such that the user can generate two electrical position signals capable of being input to a computing machine using fine motor movements of two fingers; and base means for supporting and stabilizing said differential movement means and said mounting means on a work surface to enable control of said apparatus in both said planes with a single hand.

19. A system for generating user controlled input signals to a computing machine as defined in claim 18 further comprising third encoding means for generating a third electrical position signal proportional to the unison movement of the first and the second receptacle means in the first plane, the third electrical position signal capable of being translated into a position in a third dimension.

20. A system for generating user controlled input signals to a computing device as defined in claim 19 wherein the first, second, and third electrical position signals correspond to an X axis position, a Y axis position, and a Z axis position on a computing machine display.

21. A system for generating user controlled input signals to a computing device as defined in claim 19 wherein the first, second, and third electrical position signals correspond to an X axis position, a Y axis position, and an intensity attribute on a computing machine display.

22. A system for generating user controlled input signals to a computing device as defined in claim 19 wherein the third encoding means comprises a linear variable displacement transformer.

23. A system for generating user controlled input signals to a computing device as defined in claim 18 wherein the second plane is substantially orthogonal to the first plane.

24. A system for generating user controlled input signals to a computing device as defined in claim 18 wherein the first encoding means comprises a first optical encoder and the second encoding means comprises a second optical encoder.

25. An apparatus for converting the movements of a user's fingers into at least one electrical signal suitable for input into a computing machine as defined in claim 1 wherein the means for detecting comprises a first finger receptacle.

26. An apparatus for converting the movements of a user's fingers into at least one electrical signal suitable for input into a computing machine as defined in claim 25 wherein the means for differentially moving comprises a second finger receptacle and a rotating member, the first finger receptacle and the second finger receptacle being mounted on the rotating member.

27. A system for generating user controlled input signals to a computing device as defined in claim 18 wherein the first receptacle means comprises a first trigger and the second receptacle means comprises a second trigger and wherein the differential movement means comprises a first and a second toothed rack connected to the first and second finger trigger, respectively, and a pinion gear engaging the first and the second toothed racks.

28. A system for generating user controlled input signals to a computing device as defined in claim 18 where the first encoding means comprises a rotary encoder.

29. An apparatus for converting the movements of a user's fingers into at least one electrical signal suitable for input into a computing machine as defined in claim 1 further comprising at least two control buttons.

30. A system for inputting two or more parameters to a computing machine using the movements of a user's fingers to control the values assigned to the parameters, the system comprising:
a first finger receptacle means;
a second finger receptacle means;
differential movement means for (a) allowing the first finger receptacle to be moved in a first plane and for (b) moving the second finger receptacle in a direction in the first plane in opposition to the movement of the first finger receptacle;
first means for encoding the movement of the first finger receptacle in the first plane into a first electrical position signal, the first electrical position signal being translatable into a first parameter;
means for mounting the first finger receptacle to allow it to be moved in a second plane;
second means for encoding the movement of the first finger receptacle in the second plane into a second electrical position signal, the second electrical position signal being translatable into a second parameter, the first and the second means for encoding responding to fine motor movements of the user's first and second fingers to control the first and the second cursor parameters; and
base means for supporting and stabilizing said differential movement means and said mounting means on a work surface to enable control of said apparatus in both said planes with a single hand.

31. A system for inputting two or more parameters into a computing machine using the movement of a user's fingers to control the values assigned to the parameters as defined in claim 30 further comprising:
unison movement means for allowing the first finger receptacle means and the second finger receptacle means to be moved in the first plane in unison; and
third encoding means for encoding the unison movement of the first and second finger receptacle means in the first plane into a third electrical position signal, the third electrical position signal being translatable into a third parameter.

32. A system for inputting two or more parameters into a computing machine using the movement of a user's fingers to control the values assigned to the parameters as defined in claim 31 wherein the unison movement means comprises a linear variable displacement transformer.

33. A system for inputting three parameters to a computing machine using the movement of a user's fingers to control the value assigned to the parameters as defined in claim 31 wherein the first and the second plane are substantially orthogonal.

34. A system for inputting three parameters to a computing machine using the movement of a user's fingers to control the value assigned to the parameters as defined in claim 30 wherein the first and the second plane are substantially orthogonal.

35. A system for inputting two or more parameters into a computing machine using the movements of a user's fingers to control the values assigned to the parameters as defined in claim 34 wherein the first means for encoding comprises a first optical encoder.

36. A system for inputting two or more parameters into a computing machine using the movements of a user's fingers to control the values assigned to the parameters as defined in claim 34 wherein the first finger receptacle means comprises a first trigger and the second finger receptacle comprises a second trigger and wherein the differential movement means comprises a first and a second toothed rack connected to the first and second finger trigger, respectively, and a pinion gear engaging the first and the second toothed racks.

* * * * *